United States Patent

[11] 3,569,880

| [72] | Inventor | Wallace W. Wahlgren<br>Oakland, Calif. |
|---|---|---|
| [21] | Appl. No. | 767,562 |
| [22] | Filed | Sept. 16, 1968 |
| [45] | Patented | Mar. 9, 1971 |
| [73] | Assignee | The Rucker Company<br>Oakland, Calif. |

[54] MAGNETICALLY OPERATED CURRENT SENSOR
5 Claims, 13 Drawing Figs.

[52] U.S. Cl. .................................................. 335/204, 335/154
[51] Int. Cl. ...................................................... H01h 51/28
[50] Field of Search............................................ 335/151--154, 204

[56] References Cited
UNITED STATES PATENTS
2,484,863 10/1949 Stilwell, Jr. .................. 335/204

| 3,188,427 | 6/1965 | Cooper et al. ................ | 335/204 |
| 3,213,231 | 10/1965 | Koltuniak et al. ............ | 335/204 |
| 3,252,083 | 5/1966 | Wager ......................... | 335/151X |
| 3,284,738 | 11/1966 | Zerfass ........................ | 335/152 |

FOREIGN PATENTS

| 830,535 | 3/1960 | Great Britain................ | 335/204 |
| 982,463 | 2/1965 | Great Britain................ | 335/204 |

*Primary Examiner*—Bernard A. Gilheany
*Assistant Examiner*—Roy N. Envall, Jr.
*Attorney*—Flehr, Hohbach, Test, Albritton and Herbert ABSTRACT: Magnetically operated current sensor having a reed switch and a magnetic yoke for mounting the reed switch on a conductor so that the reed switch lies in the magnetic field created by current flowing in the conductor.

Patented March 9, 1971

3,569,880

INVENTOR.
Wallace W. Wahlgren
BY Flehr, Hohbach, Test,
Albritton & Herbert
Attorneys

MAGNETICALLY OPERATED CURRENT SENSOR

BACKGROUND OF THE INVENTION

In the operation of ground fault circuit interrupters, it has been found that the relay trip circuit breakers and the like which have been utilized have been relatively insensitive to load currents. In addition, such circuit breakers have been relatively expensive to install. There is, therefore, a need for a new and improved magnetically operated current sensing means which can be utilized to trip circuit breakers in connection with the ground fault detection systems.

SUMMARY OF THE INVENTION AND OBJECTS

The magnetically operated current sensor consists of a reed switch having a pair of contacts enclosed within a glass envelope and in which the reed switch is disposed adjacent the conductor carrying the load current.

In general, it is the object of the present invention to provide a magnetically operated current sensor which is very sensitive.

Another object of the invention is to provide a current sensor of the above character which does not require the use of a solenoid or a magnet.

Another object of the invention is to provide a current sensor of the above character which can be readily installed.

Another object of the invention is to provide a current sensor of the above character which is relatively inexpensive.

Additional objects and features of the invention will appear from the following description in which the preferred embodiments are set forth in detail in connection with the accompanying drawings.

DESCRIPTION OF THE PREFERRED EMBODIMENTS

Figure 1:
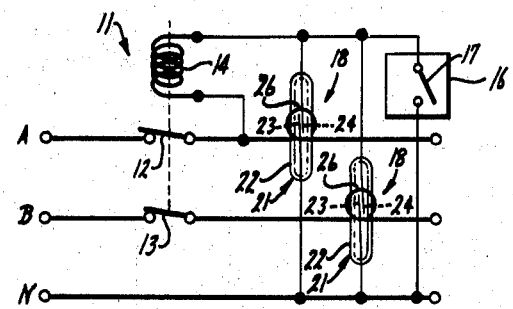
FIG. 1 is a view of a circuit incorporating the present invention.

In FIG. 1 there is shown a magnetically operated current sensor utilized as an overload actuator in a circuit. In FIG. 1, there have been shown three conductors identified as A, B and N which, for example, could be a 120—240 volt distribution system with 120 volts appearing between conductors A and N, and B and N, and 240 volts appearing across conductors A and B. A circuit breaker 11 is provided for interrupting the power flow in the circuit and includes circuit breaker contacts 12 and 13 connected into lines or conductors A and B and which are adapted to be moved to an open position by a trip coil 14. The circuit breaker 11 is of conventional construction and, therefore, will not be described in detail.

Means is provided for detecting ground faults and is represented by the box 16 which has a movable contact 17 therein representing the operation of the ground fault detector to energize the trip coil 14 and to open the contacts 12 and 13 in the event a ground fault occurs. The ground fault detector can be of the type disclosed in U.S. Pat. No. 3,213,321.

In addition to the ground fault detection, there is provided means for detecting overloads in the circuit and consists of overload detectors 18 provided in the lines or conductors A and B. Each of the overload detectors consist of a reed switch 21 which is of a conventional type. The reed switch typically consists of a glass capsule 22 which has encapsulated therein a pair of contact bearings, flat metal reeds 23 and 24 which can be flexed to open and close the contacts carried by the reeds. The reeds are formed of a low reluctance material and, as can be seen from the drawing, are of substantially equal length and are supported as cantilevers within the glass capsule and which overlap generally at the center of the glass capsule. The overlapping ends of the reeds carry the contacts. The glass capsule can be filled with dry inert gas, or alternatively, can be evacuated.

As can be seen from FIG. 1, each of the overload detectors, in addition to the reed switch 21, includes a single turn 26 in the conductor in which it is mounted. The single turn 26 is provided in the conductor so that it lies in the same plane as the conductor and in the direction in which the current travels through the conductor. The single turn is of such a size so that the reed switch 21 can be placed within the turn as shown in FIG. 1 and so that the reeds 23 and 24 carried thereby are substantially at right angles to the direction of current flow in the conductor. It is also preferable that the reed switch be centered in the conductor so that both reeds are affected equally by the magnetic flux created by current flow in the conductor. As can be seen, the reeds of the reed switches 21 are connected between neutral and one side of the trip coil 14 and the other side of the trip coil is connected to one of the conductors A and B. Thus, it can be seen that when either of the reed switches 21 is closed, the trip coil 14 will be energized to operate the circuit breaker.

It has been found that the single turn of the conductor with the current flowing through the same produces a magnetic field in and about the reed switch. The magnetic lines of the magnetic field generally lie in planes which are normal to the direction of flow of current in the conductor. When the magnetic field becomes sufficiently strong, the reed switch will pull in or, in other words, will close its contacts to establish a circuit for the energization of the trip coil 14 and to thus operate the circuit breaker. As is well known to those skilled in the art, the reed switches 21 are operated by magnetic induction produced by the magnetic field originating exterior to the capsule of the switch. Closing of the contacts of the reed switch depends upon both the pattern of the applied magnetic field and its intensity.

By the utilization of the reed switch, it has been found that it is possible to provide a very simple overload detector for the circuit. Thus, as shown, it is possible to provide a reed switch in a single turn of the conductor to provide overload detection which will operate to open the circuit breaker whenever a current of greater than a predetermined value is flowing through the conductor.

In the event the trip coil 14 of the circuit breaker requires a current which is greater than that which can be carried by the reed switch, the reed switch can be utilized for triggering suitable means having greater current carrying capacity such as a relay or the anode gate of a silicon controlled switch and to cause it to operate the circuit breaker without affecting the normal sensitivity of the ground fault detector 16.

From the foregoing, it can be seen that the circuit which is shown in FIG. 1 is provided with ground fault detecting means and, in addition, is provided with overload detecting means.

The reed switches 21 serve as a very simple means for providing overload detection.

Figure 2:
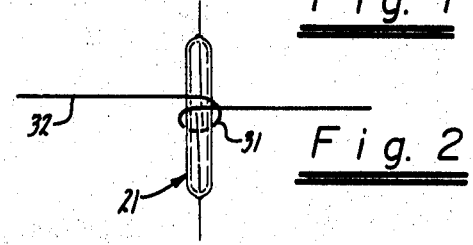
FIG. 2 is an enlarged detailed view of a portion of the circuit shown in FIG. 1 and in particular shows a magnetically operated current sensor incorporating the present invention.

One of the simplest forms of current sensor incorporating the present invention is shown in FIG. 2 and is of the type which was utilized in FIG. 1. It consists of a reed switch 21 of the type hereinbefore described which is disposed within a single turn 31 of a current carrying conductor 32. By way of example, it has been found that a current sensor of the type as shown in FIG. 2 utilizing a Gordas-type MR107 reed switch inserted in a single loop of No. 10 TW wire with the loop having an inside diameter of approximately one-eighth inch operated very satisfactorily. It was found that with 115 volts AC applied to the conductor that vibratory closing of the reed switch occurred at 13 amperes rms which is equal to 18 amperes peak. By vibratory closing, it is means that the reeds touch and make contact twice per cycle but do not lock closed. The duration of the closing period is a function of the time that the instantaneous current exceeded 18 amperes.

The reed switch will close its contacts when immersed in a magnetic field of sufficient intensity and properly oriented to cause the magnetic force between the two magnetic reeds to exceed the bending moment of the reeds sufficiently to make them touch. In general, a current in a conductor of any waveshape but having sufficient energy content to motivate the reeds of a reed switch will close the reed switch either fully or in a vibrational mode depending upon the waveshape and frequency.

Figure 3:
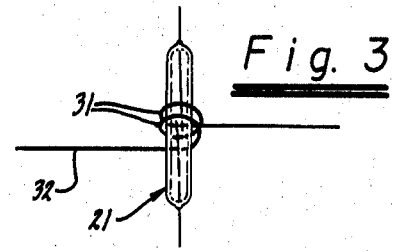
FIG. 3 is a view similar to FIG. 2 but showing an alternative embodiment.

If desired, there are various approaches which can be taken to increase the magnetic field and the flux density in proportion to the geometry and permeability of the reed switch. Thus, as shown in FIG. 3, instead of the one turn or loop 31, two turns or loops 31 can be placed in the conductor 32 which, in effect, would substantially double the sensitivity of the reed switch 21.

Figure 4:
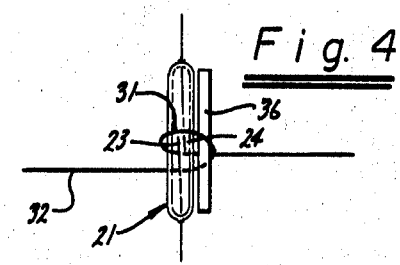
FIG. 4 is a view similar to FIG. 3 but showing another embodiment.

As shown in FIG. 4, the sensitivity of the reed switch may be increased by placing the reed switch in the magnetic field of a permanent magnet 36 in a direction so that the north and south poles of the permanent magnet 36 are lying along an axis which is substantially parallel to the reeds 23 and 24 of the reed switch and has its ends terminating at points which are generally commensurate with the lengths of the reeds within the reed switch as shown in FIG. 4. The permanent magnet is disposed in relatively close proximity to the reed switch and is chosen so that the magnetic field created thereby is sufficient to operate the reed switch but which does create a magnetic field which aids the magnetic field created by current flowing in the conductor 32 to substantially reduce the number of ampere turns required to close the reeds of the reed switch. The magnetic field created by the magnet 36 is sufficient to hold the contacts closed after they have been closed.

Figure 5:
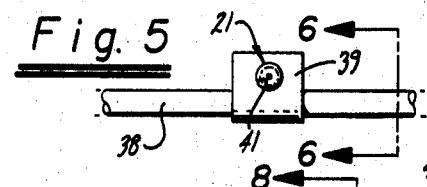
FIG. 5 is a side elevational view of a magnetically operated current sensor incorporating the present invention.
Figure 6:
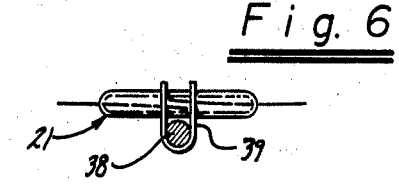
FIG. 6 is a cross-sectional view taken along the line 6—6 of FIG. 5.

The current sensor can also be formed by a reed switch which is merely mounted on one side of a single conductor. However, in such an application, considerably more current is required for establishing a magnetic field which is adequate to operate the reed switch. A single conductor 38 without a loop or a turn is shown in FIG. 5. However, to increase the magnetic coupling with the reed switch 21, magnetic materials are introduced into the magnetic circuit to change the flux pattern and to, in effect, short circuit the flux pattern in part by a high permeability magnetic material thereby decreasing the reluctance of the magnetic path and increasing the magnetic field and flux density in proportion to the geometry and permeability of the inserted material. This high permeability magnetic material is formed as a clip or magnetic yoke 39 as shown in FIGS. 5 and 6 which is generally U-shaped so that it can be slipped over the conductor 38 which is provided with a pair of aligned holes 41 that are adapted to receive the reed switch 21 so that it extends in a direction which is normal to the flow of current through the conductor 38 and is in relatively close proximity to the conductor 38.

Figures 7, 8:
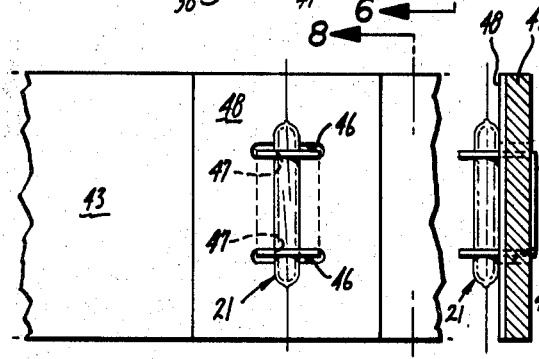
FIG. 7 is a top plan view of a current sensor being used in connection with a bus bar.
FIG. 8 is a cross-sectional view taken along the line 8—8 of FIG. 7.

When the conductor is in the form of a bus bar, such as bus bar 43 as shown in FIGS. 7 and 8, the reed switch 21 is again mounted on the bus bar in a direction normal to the flow of current within the bus bar. To hold the reed switch in place, a magnetic clip or yoke 44 which is generally U-shaped as shown in FIG. 8 can extend through a pair of spaced parallel slots 46 provided in the bus bar. The clip 44 has a pair of aligned holes 47 therein adapted to receive the reed switch 21 and to hold it in a position so it is in relatively close proximity to the bus bar 43 and extends in a direction which is normal to the bus bar. A pad 48 formed of an insulating material can be provided on the side of the bus bar on which the reed switch is mounted to serve to protect the reed switch. In the arrangement shown, the reed switch will not encompass all of the amperes which are flowing in the bus bar because the reed switch only extends across approximately one-half of the bus bar. If desired, the size of the magnetic yoke 44 can be increased to encompass the entire width of a bus bar and, therefore, all the amperes which are carried by the bus bar increase the magnetic field in the proximity of the reed switch.

Figures 9, 10:
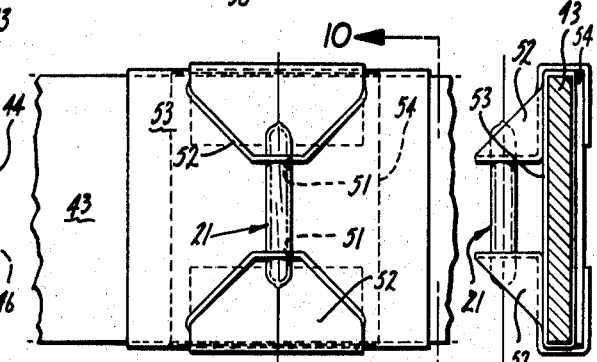
FIG. 9 is a top plan view showing a current sensor being utilized with a bus bar and brackets for supporting the magnetically operated current sensor on the bus bar.
FIG. 10 is a cross-sectional view taken along the line 10—10 of FIG. 9.

Such an arrangement is shown in FIGS. 9 and 10 in which the ends of the reed switch 21 are disposed in holes 51 provided in a pair of clips or magnetic yokes 52 which are secured to the side margins of the bus bar 43 by suitable means such as friction fit. An insulating pad 53 is provided around the conductor 43 and is disposed beneath the yokes 52 and the reed switch 21 carried thereby. A metal plate 54 is mounted in the yokes 52 adjacent the pad 53 and is provided for lowering the magnetic reluctance of the path for the magnetic flux.

The current trip level of a given reed switch can be readily adjusted by means of magnetic shunts placed across the reed switch or by angularly adjusting the reed switch with respect to the conductor. As the angle of the reed switch is shifted from a position normal to the travel of current in the conductor, the reed switch becomes less sensitive and requires more ampere turns to operate the same.

Figure 11:
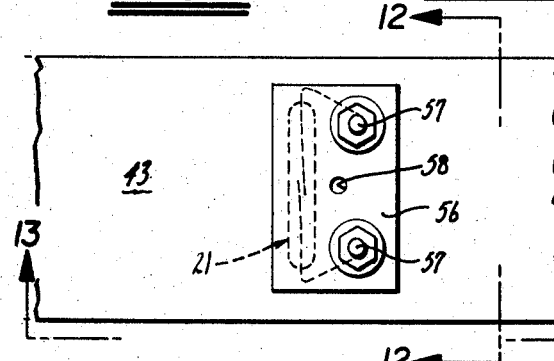
FIG. 11 is a top plan view of another embodiment of the magnetically operated current sensor.
Figure 12:
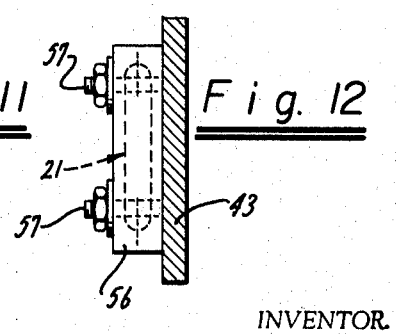
FIG. 12 is a cross-sectional view taken along the line 12—12 of FIG. 11.
Figure 13:
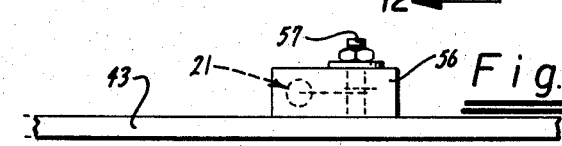
FIG. 13 is a side elevational view looking along the line 13—13 of FIG. 11.

In the event that it is desired to utilize the current sensor on conductors carrying high voltages, it may be desirable to insulate the reed switch and the circuit to which it is connected from the high voltage. Such an arrangement is shown in FIGS. 11, 12 and 13 in which the reed switch 21 is encapsulated in a block 56 of a suitable insulating material such as plastic and which is provided with a pair of terminals 57 mounted therein to which the ends of the reed switch are connected. The block 56 can be secured to the bus bar 43 by suitable means such as an adhesive. If desired, the block 56 can be secured to the bus bar by suitable means such as a bolt (not shown) extending through a hole 58 provided in the block 56.

It is apparent from the foregoing that there has been provided a magnetically operated current sensor which is capable of sensing the magnitude of load currents, overload conditions in electrical bus bars and in power conductors in industrial, commercial and residential applications in which it is desired to supply a signal to stimulate an action in connection with the current which is flowing. The present magnetically operated current sensor provides an inexpensive and effective means for obtaining signals for controlling an electrical system and which can be utilized on either AC or DC power circuits. The magnetically operated current sensor provides an inexpensive means for metering, monitoring, controlling or cutting off current when certain events relative to the current magnitude take place. The magnetically operated current sensors utilize the magnetic field created by current flowing in the power conductors or bus bars without being connected electrically to or touching the power circuit involved. As explained previously, the reed switches are activated by the magnitude of the conductor current and can be caused to act upon a control circuit to perform any desired function as, for example, opening the holding coil circuit of the magnetic contactor when a specified current level is exceeded. A multiplicity of the current sensors can be utilized on a given bus or conductor system with each current sensor having a different switching level to control the activities of an industrial process system where a specific function should be performed when certain critical current levels occur in the power conductors.

In all the embodiments hereinbefore described, maximum sensitivity is obtained when the reed switch is at right angles to or normal to and centered with respect to the flow of current within the conductor or bus bar. The sensitivity can be adjusted merely by shifting the angular position of the reed switch with respect to a position which is normal to or perpendicular to the direction of current flow in the conductor or bus bar. In addition, the sensitivity of the current sensor can be readily changed by the use of magnetic yokes, permanent magnets and the like.

It is apparent from the foregoing that there has been provided a magnetically operated current sensor which is relatively inexpensive and economical. In addition, it is one which can be readily installed and which will not interfere with the operation of the power circuit.

I claim:

1. In a current sensor for use in sensing the magnitude of alternating or direct current flow in a conductor, a reed switch comprising a capsule and a pair of flexible reeds carried within said capsule, said reeds having contacts movable between open and closed positions, and magnetic yoke means for positioning said reed switch with respect to said conductor so that said reed switch intersects a substantial number of lines of magnetic flux of the magnetic field created by current flowing through the conductor, said conductor being in the form of a bus bar having spaced slots therein, and said magnetic yoke means comprising a generally U-shaped clip member fabricated of a material having a high magnetic permeability, said clip member being formed to include base and leg portions, said base portion being in intimate contact with one surface of said bus bar and said leg portions extending through the slots in said bus bar and being formed to include a pair of aligned holes in which said reed switch is mounted in proximity to said conductor.

2. A current sensor as in claim 1 together with insulative pad means disposed intermediate said reed switch and the surface of said bus bar opposite the surface in contact with the base portion of said clip member.

3. In a current sensor for sensing the magnitude of alternating or direct current in a bus bar conductor, a reed switch comprising a capsule and a pair of flexible reeds carried within said capsule, said reeds having contacts movable between open and closed positions, and magnetic yoke means for positioning said reed switch with respect to the bus bar conductor so that said reed switch intersects a substantial number of lines of magnetic flux of the magnetic field created by current flowing through the conductor, said magnetic yoke means including a pair of clip members fabricated of a magnetic material removably mounted on opposite sides of said bus bar conductor, said clip members having ear portions extending above a first surface of said bar conductor, said ear portions being formed to include aligned openings in which said reed switch is mounted in proximity to said conductor.

4. A current sensor as in claim 3 together with a magnetic plate member extending between said clip members and engaging a second surface of said bus bar conductor.

5. In a current sensor for sensing the magnitude of alternating or direct current in a conductor having a circular cross section, a reed switch comprising a capsule and a pair of flexible reeds carried within said capsule, said reeds having contacts movable between open and closed positions, and magnetic yoke means for positioning said reed switch with respect to the conductor so that said reed switch intersects a substantial number of lines of magnetic flux of the magnetic field created by current flowing through the conductor, said magnetic yoke means comprising a U-shaped clip of magnetic material, said clip consisting of two generally parallel leg portions and a rounded portion intermediate said leg portions, said rounded portion engaging at least one half of the circumference of said conductor, whereby said clip is mounted on and supported by said conductor, and said portions being formed to include aligned openings in which said reed switch is mounted in proximity to said conductor.